Dec. 26, 1950 E. T. J. TAPP ET AL 2,535,762
MECHANISM FOR ADJUSTING THE SPACING OF TRACTION
DRIVE MEANS FOR VARIABLE TRACK VEHICLES
Filed July 31, 1947 3 Sheets-Sheet 1

Inventors.
Ernest Thomas James Tapp, & Joseph Davey.
By
Attorneys.

Dec. 26, 1950 E. T. J. TAPP ET AL 2,535,762
MECHANISM FOR ADJUSTING THE SPACING OF TRACTION
DRIVE MEANS FOR VARIABLE TRACK VEHICLES
Filed July 31, 1947 3 Sheets-Sheet 2
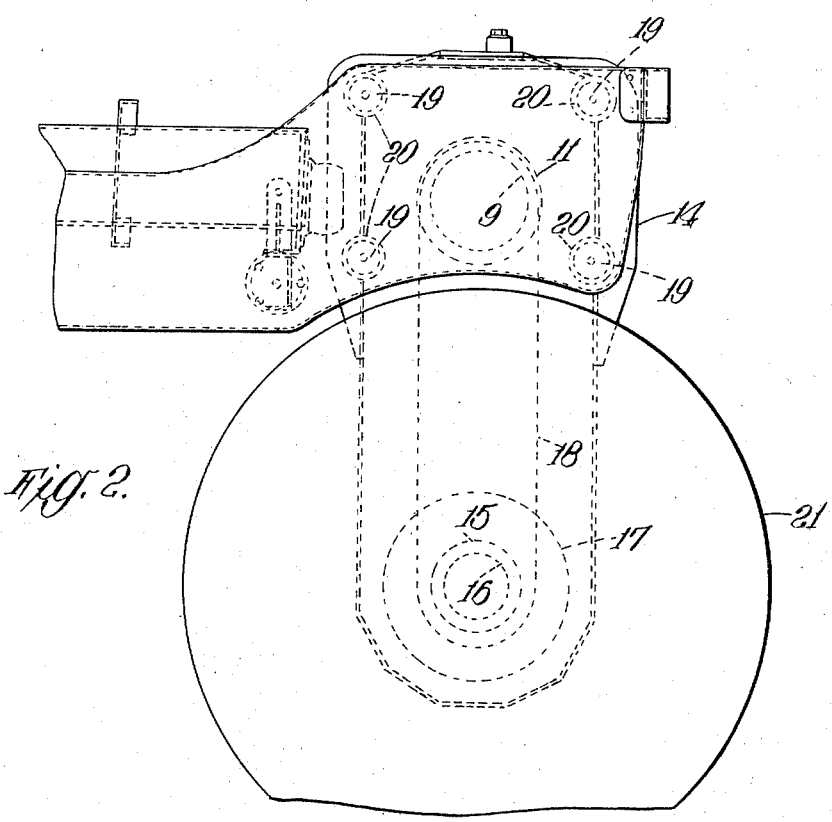
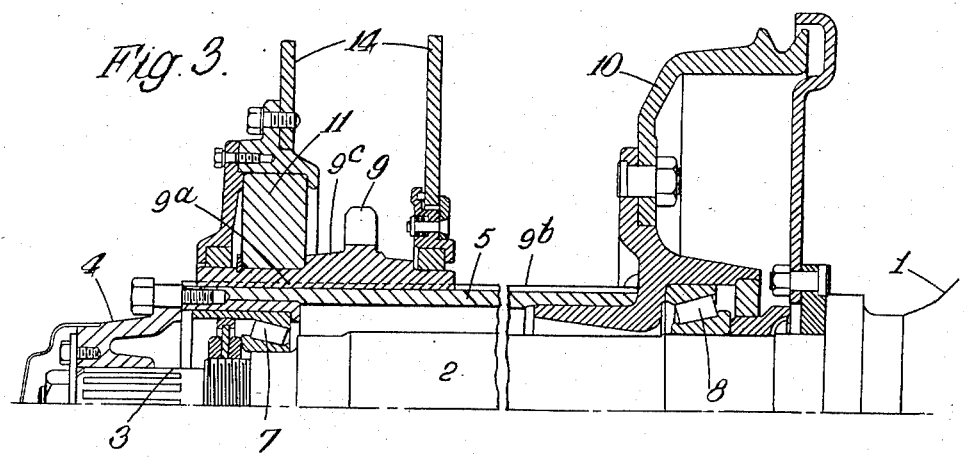

Dec. 26, 1950 E. T. J. TAPP ET AL 2,535,762
MECHANISM FOR ADJUSTING THE SPACING OF TRACTION
DRIVE MEANS FOR VARIABLE TRACK VEHICLES
Filed July 31, 1947 3 Sheets-Sheet 3
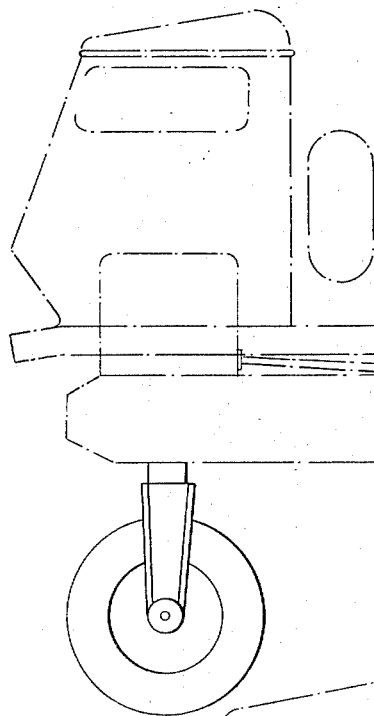
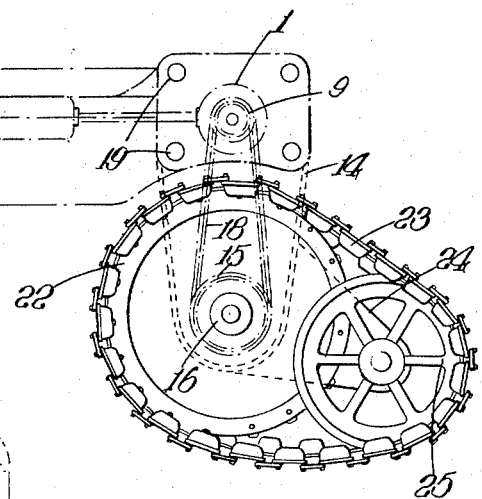
Fig. 4.
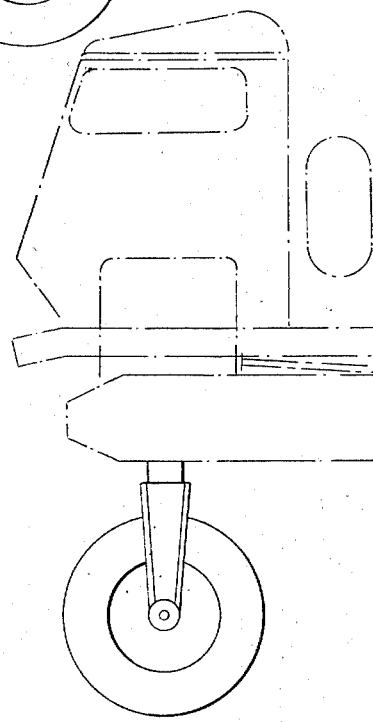
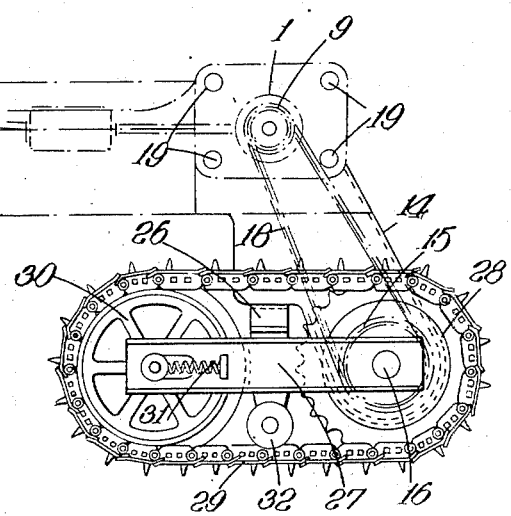
Fig. 5.
Inventors
Ernest Thomas James Tapp, & Joseph Davy
By Thiess, Olsen & Mecklenburgh
Attorneys Patented Dec. 26, 1950

2,535,762

UNITED STATES PATENT OFFICE 2,535,762

MECHANISM FOR ADJUSTING THE SPACING OF TRACTION DRIVE MEANS FOR VARIABLE TRACK VEHICLES

Ernest T. J. Tapp and Joseph Davey, Fleet, England, assignors to Pest Control Limited, Harston, Cambridgeshire, England, a British company Application July 31, 1947, Serial No. 765,093
In Great Britain May 23, 1946

Section 1, Public Law 690, August 8, 1946
Patent expires May 23, 1966

6 Claims. (Cl. 180—75)

1

This invention relates to an improved drive for variable track vehicles.

It is often desirable for special purposes to vary the track of a vehicle. For example with agricultural vehicles employed for spraying or cultivating rows of crops it is desirable to be able to widen or narrow the track at will to suit the width of crop rows, so that the wheels of the vehicle always run along the space between adjacent rows.

According to this invention there is provided an improved drive for variable track vehicles comprising a transverse driven shaft, a plurality of load-carrying transverse members disposed around the driven shaft, a downwardly extending tubular casing on each side of the vehicle having its upper part slideably mounted on the transverse members and carrying a driving wheel on its lower part, the driven shaft being supported towards its outer end by the upper part of the tubular casing, and within the tubular casing a final drive to the driving wheel, the final drive being positively engaged with and slideable with respect to the driven shaft. The driving wheel may be a road wheel or a track-driving wheel. Thus, on transverse displacement of the casing to vary the track, the drive to the wheel or track is not interrupted.

Preferably the driven shaft is slideably received and supported towards its outer end in a bearing in the upper part of the tubular casing, and the final drive comprises a sprocket or gear wheel which is slideable on the driven shaft and is in driving connection with the road wheel or track-driving wheel through a chain or a train of gears or a shaft and bevel wheel.

The improved drive is of particular value when applied to high clearance vehicles, such as agricultural spraying or cultivating vehicles, since the driven wheels or tracks may be mounted on the tubular casing well below the driven shaft, thus raising the driven shaft and leaving a complete free space beneath it.

Some embodiments of the invention will now be described by way of example with reference to the accompanying drawings, in which:

Fig. 2 is a side elevation thereof,

Fig. 3 is a detail vertical median section through one half of the rear axle,

Fig. 4 is a side elevation of a modified vehicle, and

Fig. 5 is a side elevation of another modified vehicle.

2

Figure 1:
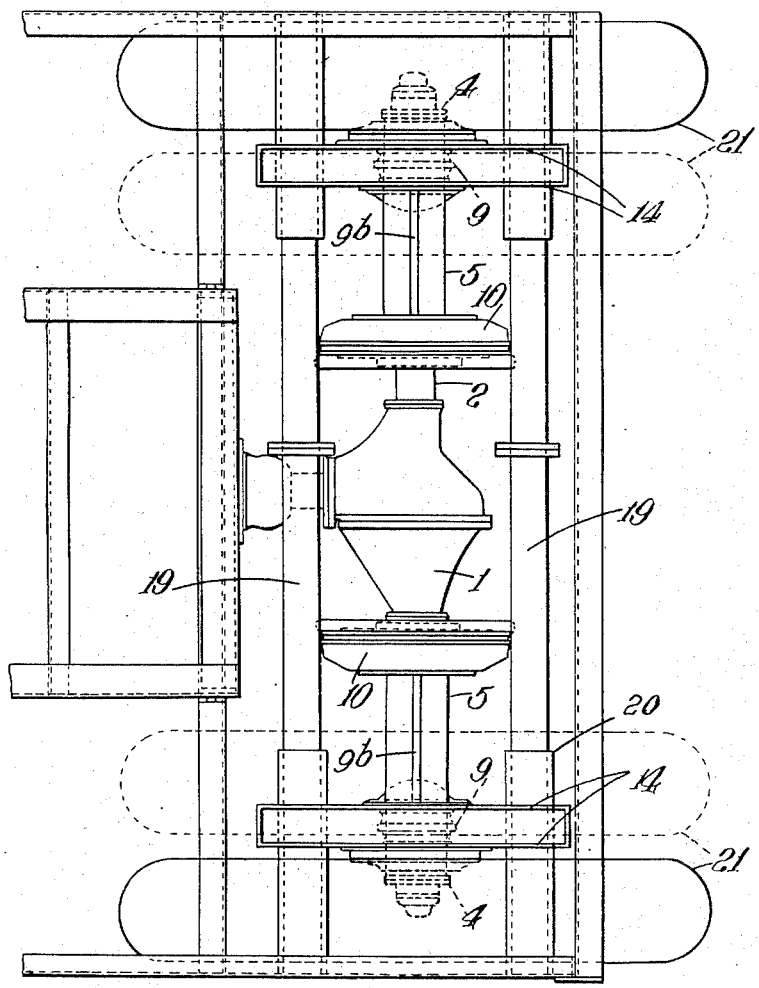
Fig. 1 is a plan view of the rear part of a vehicle.

Referring now to Figs. 1 to 3, the vehicle is provided with a normal type of live axle, having a differential casing 1, with a laterally extending fixed tube 2 at each side, each tube carrying a driven half shaft 3. The end of the half shaft is provided with a flange 4 which is bolted to a large diameter driven tube 5 extending inwardly over the fixed tube 2, and rotatably mounted on bearings 7 and 8 provided respectively at the outer end and inner end of the fixed tube 2. A sprocket wheel 9 is slideably mounted on the driven tube and is held in driving engagement by means of a mating key or keys 9a engaging with one or more keyways 9b extending along the greater part of the length of the driven tube. A brake drum 10 is preferably mounted at the inner end of each driven tube.

The hub 9c of the sprocket wheel 9 is extended sufficiently to carry a surrounding main bearing 11 which rests in turn in a tubular chain case 14. The tubular case extends downwards and carries another sprocket wheel 15 on a short or stub shaft 16 which extends outwardly through the lower part of the tubular case and is provided with a suitable flange 17 adjacent the outer end of shaft 16 for attachment of the road wheel 21. A chain 18 transmits drive from the sprocket wheel 9 to the sprocket wheel 15 mounted adjacent the inner end of shaft 16.

The tubular cases 14 are carried on four cylindrical transverse members 19 extending across the chassis frame, the upper part of the cases being provided with cylindrical bearings 20 sliding on the members 19. In this way the wheels may be moved from the position of greatest width, shown in full line in Fig. 1, to the position of least width, shown in dotted line. Suitable means such as bolts (not shown) are provided for locking the cases at suitable intervals along the transverse members.

It will be seen that the driven tube 5 is positioned and carried by the transverse members 19 through the medium of the tubular casing 14, and the bearing 11 surrounding the hub of the sprocket wheel 9. The fixed tube 2 and the half-shaft 3 are in turn positioned and carried by the driven tube 5. Drive may be taken from the engine of the vehicle to the differential 1 through a gearbox and flexible coupling.

In Figs. 4 and 5, like reference numerals indicate like parts as in Figs. 1 to 3.

In the modification shown in Fig. 4 the road wheel has been replaced by the driving wheel 22 of an endless half-track 23. An arm 24, pivoted about the axis of the shaft 16, carries an idler wheel 25.

In the modification shown in Fig. 5, the chain case 14 is inclined rearwardly and is provided with a downward extension 26 carrying a girder 27. The shaft 16, journalled at its outer end in the rear of the girder 27, carries the driving wheel 28 of an endless half-track 29. An idler wheel 30 is slideably mounted in the forward part of the girder 27. A track-tensioning spring 31 urges the wheel 30 to slide forward in its mounting. A small diameter idler wheel 32, carried by an arm depending from the girder 27, engages the lower run of the half-track 29.

We claim:

1. An improved drive for a variable track vehicle comprising a transverse driven shaft, a plurality of load-carrying transverse members disposed around said driven shaft, a downwardly extending tubular casing on each side of said vehicle having its upper part slideably mounted on said transverse members and carrying a driving wheel on its lower part, a transmission wheel rotatably mounted within said upper part of said tubular casing and slideably mounted on said driven shaft for adjustment axially thereof but fixed for rotation therewith, and within said tubular casing a driving connection from said transmission wheel to said driving wheel.

2. An improved drive for a variable track vehicle comprising a transverse driven shaft, a plurality of load-carrying transverse members disposed around said driven shaft, a downwardly extending tubular casing on each side of said vehicle having its upper part slideably mounted on said transverse members, a sprocket wheel rotatably mounted in said upper part of said casing and slideably mounted on said driven shaft for adjustment axially thereof but fixed for rotation therewith, a stub shaft journalled in the lower outer wall of said tubular casing, a driving wheel on the outer end of said stub shaft, a second sprocket wheel on the inner end of said stub shaft, and a chain connecting said two sprocket wheels in driving relation.

3. An improved drive for a variable track vehicle comprising a transverse driven shaft, a transmission wheel slideably mounted on said driven shaft for adjustment axially thereof but fixed for rotation therewith, a plurality of load-carrying transverse members disposed around said driven shaft, a downwardly extending tubular casing on each side of said vehicle having its upper part slideably mounted on said transverse members and carrying a driving wheel on its lower part, a bearing in the said upper part of said tubular casing, an extended hub on said transmission wheel journalled in said bearing, and within said tubular casing a driving connection from said transmission wheel to said driving wheel.

4. An improved drive for a variable track vehicle comprising a driven half-shaft, a fixed concentric tube surrounding said driven half-shaft, a driven concentric tube surrounding said fixed concentric tube and coupled at its outer end to said driven half-shaft, bearings on said fixed tube supporting said driven tube near the two ends thereof, a plurality of load-carrying transverse members surrounding said driven tube, a downwardly extending tubular casing on each side of said vehicle having its upper part slidably mounted on said transverse members and carrying a driving wheel on its lower part, a transmission wheel rotatably mounted within said upper part of said tubular casing and slideably mounted on said driven concentric tube for adjustment axially thereof but fixed for rotation therewith, and within said tubular casing a driving connection from said transmission wheel to said driving wheel.

5. An improved drive for a variable track vehicle comprising a driven half-shaft, a fixed concentric tube surrounding said driven half-shaft, a driven concentric tube surrounding said fixed concentric tube and coupled at its outer end to said driven half-shaft, bearings on said fixed tube supporting said driven tube near the two ends thereof, a transmission wheel slideably mounted on said driven tube for adjustment axially thereof but fixed for rotation therewith, a plurality of load-carrying transverse members surrounding said driven tube, a downwardly extending tubular casing on each side of said vehicle having its upper part slideably mounted on said transverse members and carrying a driving wheel on its lower part, a bearing in the upper part of said tubular casing, an extended hub on said transmission wheel journalled in said bearing, and a driving connection within said tubular casing between said transmission wheel and said driving wheel.

6. An improved drive for a variable track vehicle comprising a driven half-shaft, a fixed concentric tube surrounding said driven half-shaft, a driven concentric tube surrounding said fixed concentric tube and coupled at its outer end to said driven half-shaft, bearings on said fixed tube supporting said driven tube near the two ends thereof, a plurality of load-carrying transverse members surrounding said driven tube, a downwardly extending tubular casing on each side of said vehicle having its upper part slideably mounted on said transverse members, a sprocket wheel rotatably mounted in said upper part of said casing and slideably mounted on said driven tube for adjustment axially thereof but fixed for rotation therewith, a stub shaft journalled in the lower outer wall of said tubular casing, a driving wheel on the outer end of said stub shaft, a second sprocket wheel on the inner end of said stub shaft, and a chain connecting said two sprocket wheels in driving relation.

ERNEST T. J. TAPP.
J. DAVEY.

REFERENCES CITED

The following references are of record in the file of this patent:

UNITED STATES PATENTS

| Number | Name | Date |
|---|---|---|
| 1,370,579 | Baker | Mar. 8, 1921 |
| 1,858,782 | Masury | May 17, 1932 |
| 2,002,002 | Brown et al. | May 21, 1935 |